US009987961B2

(12) United States Patent
Zouzal et al.

(10) Patent No.: US 9,987,961 B2
(45) Date of Patent: Jun. 5, 2018

(54) ADJUSTABLE SEAT ASSEMBLY

(71) Applicants: Lear Corporation, Southfield, MI (US); Winsen C. Zouzal, Detroit, MI (US)

(72) Inventors: Winsen C. Zouzal, Detroit, MI (US); Ashford Allen Galbreath, Troy, MI (US); Gerald Patrick, Shelby Township, MI (US); Karl Henn, New Hudson, MI (US); Kim Krulek, Wyoming, MI (US); Michelle A. Pereny, Farmington Hills, MI (US); Samuel Hanlon, Livonia, MI (US)

(73) Assignee: Lear Corporation, Southfield, MI (US)

( * ) Notice: Subject to any disclaimer, the term of this patent is extended or adjusted under 35 U.S.C. 154(b) by 0 days. days.

(21) Appl. No.: 14/575,474

(22) Filed: Dec. 18, 2014

(65) Prior Publication Data
US 2015/0352990 A1    Dec. 10, 2015

Related U.S. Application Data

(60) Provisional application No. 62/009,585, filed on Jun. 9, 2014.

(51) Int. Cl.
*B60N 2/66*    (2006.01)
*B60N 2/02*    (2006.01)
(Continued)

(52) U.S. Cl.
CPC ............... *B60N 2/665* (2015.04); *A47C 4/54* (2013.01); *A47C 7/467* (2013.01); *A47C 31/126* (2013.01);
(Continued)

(58) Field of Classification Search
CPC ........ A47C 4/54; A47C 7/467; B60N 2/0232; B60N 2/0244; B60N 2/4415
(Continued)

(56) References Cited

U.S. PATENT DOCUMENTS

| 4,477,874 A | 10/1984 | Ikuta et al. |
| 4,679,855 A | 7/1987 | Hattori et al. |

(Continued)

FOREIGN PATENT DOCUMENTS

| CN | 1087804 A | 6/1994 |
| CN | 101161500 A | 4/2008 |

(Continued)

OTHER PUBLICATIONS

U.S. Appl. No. 14/869,093, entitled "Air Bladder Assembly for Seat Bottoms of Seat Assemblies", filed Sep. 29, 2015, 14 pages.
(Continued)

*Primary Examiner* — Thomas G Black
*Assistant Examiner* — Wae L Louie
(74) *Attorney, Agent, or Firm* — Brooks Kushman P.C.

(57) ABSTRACT

A seat assembly is provided with a seat cushion and a pivotal seat back. Sensors are connected to the seat cushion and/or the seat back to detect a seating position. An actuator is connected to the seat cushion and/or the seat back for adjustment. A controller is configured to receive data from the plurality sensors, compare the data to determine if the occupant is seated evenly, and adjust the actuator to balance the occupant posture seating position. The controller is in electrical communication with an inflation device to inflate a first air bladder assembly in a thoracic region of the seat back. A second air bladder assembly oriented in a lumbar region, a sacrum region, and/or a scapular region of the seat back is inflated after initiating inflation of the first air bladder assembly for sequential posture alignment.

21 Claims, 5 Drawing Sheets

(51) Int. Cl.
  *A47C 7/46* (2006.01)
  *G05B 19/042* (2006.01)
  *A47C 31/12* (2006.01)
  *A47C 4/54* (2006.01)
  *G05B 15/02* (2006.01)

(52) U.S. Cl.
  CPC ....... *B60N 2/0232* (2013.01); *G05B 19/0426* (2013.01); *G05B 15/02* (2013.01); *G05B 2219/13004* (2013.01); *G05B 2219/2637* (2013.01)

(58) Field of Classification Search
  USPC ............ 701/36, 49; 297/337, 452.41, 284.4; 340/425.5
  See application file for complete search history.

(56) References Cited

U.S. PATENT DOCUMENTS

| | | | |
|---|---|---|---|
| 5,019,759 A | 5/1991 | Takemura et al. | |
| 5,707,109 A * | 1/1998 | Massara | B60N 2/4415 297/284.9 |
| 5,967,608 A | 10/1999 | Van Sickle | |
| 5,975,633 A | 11/1999 | Walk et al. | |
| 6,088,642 A | 7/2000 | Finkelstein et al. | |
| 6,088,643 A | 7/2000 | Long et al. | |
| 6,129,419 A * | 10/2000 | Neale | B60N 2/4415 297/284.4 |
| 6,203,105 B1 * | 3/2001 | Rhodes, Jr. | A47C 4/54 297/284.1 |
| 6,220,667 B1 | 4/2001 | Wagner | |
| 6,227,563 B1 | 5/2001 | Talisman | |
| 6,273,810 B1 * | 8/2001 | Rhodes, Jr. | A47C 4/54 297/180.13 |
| 6,289,538 B1 * | 9/2001 | Fidge | A47C 7/383 297/393 |
| 6,392,550 B1 | 5/2002 | Najor | |
| 6,398,303 B1 | 6/2002 | Herrmann et al. | |
| 6,578,916 B2 | 6/2003 | Longhi et al. | |
| 6,592,533 B1 | 7/2003 | Yonekawa et al. | |
| 6,682,059 B1 | 1/2004 | Daniels et al. | |
| 7,131,697 B2 | 11/2006 | Beermann et al. | |
| 7,152,920 B2 | 12/2006 | Sugiyama et al. | |
| 7,537,286 B2 | 5/2009 | Walker et al. | |
| 7,663,502 B2 | 2/2010 | Breed | |
| 7,797,771 B1 | 9/2010 | Bossen et al. | |
| 7,865,375 B2 | 1/2011 | Lancaster et al. | |
| 7,917,264 B2 | 3/2011 | Hozumi et al. | |
| 7,967,379 B2 | 6/2011 | Walters et al. | |
| 8,054,203 B2 | 11/2011 | Breed et al. | |
| 8,251,447 B2 | 8/2012 | Fujita et al. | |
| 8,348,339 B2 * | 1/2013 | Onuma | B60N 2/002 297/284.3 |
| 8,474,908 B2 | 7/2013 | Petzel et al. | |
| 8,596,716 B1 | 12/2013 | Caruso | |
| 8,616,654 B2 * | 12/2013 | Zenk | B60N 2/4415 297/284.3 |
| 8,690,249 B2 | 4/2014 | Kang et al. | |
| 8,775,018 B2 | 7/2014 | Uenuma et al. | |
| 8,931,837 B2 | 1/2015 | Vernon | |
| 8,958,955 B2 | 2/2015 | Hotary et al. | |
| 9,049,937 B2 | 6/2015 | Walker | |
| 9,381,840 B2 | 7/2016 | Tobata et al. | |
| 2002/0056709 A1 | 5/2002 | Burt | |
| 2002/0089220 A1 | 7/2002 | Achleitner et al. | |
| 2002/0096915 A1 | 7/2002 | Haupt et al. | |
| 2002/0167486 A1 | 11/2002 | Tan et al. | |
| 2003/0023363 A1 | 1/2003 | Katz et al. | |
| 2003/0080699 A1 * | 5/2003 | Rumney | B60N 2/002 318/9 |
| 2003/0226399 A1 | 12/2003 | Clingerman et al. | |
| 2005/0067868 A1 | 3/2005 | Kern et al. | |
| 2006/0061315 A1 * | 3/2006 | Schmidt | B60N 2/0228 318/568.1 |
| 2006/0103193 A1 | 5/2006 | Kramer | |
| 2006/0290175 A1 | 12/2006 | Hartwich | |
| 2007/0106188 A1 | 5/2007 | Walker | |
| 2008/0009989 A1 * | 1/2008 | Kim | B60N 2/0232 701/36 |
| 2008/0116730 A1 * | 5/2008 | Connolly | A47C 7/46 297/284.4 |
| 2008/0255731 A1 | 10/2008 | Mita et al. | |
| 2008/0267460 A1 | 10/2008 | Aoki et al. | |
| 2008/0277985 A1 | 11/2008 | Petzel | |
| 2009/0026821 A1 | 1/2009 | Macht et al. | |
| 2009/0030578 A1 | 1/2009 | Periot et al. | |
| 2009/0058661 A1 | 3/2009 | Gleckler et al. | |
| 2009/0088930 A1 | 4/2009 | Ohtsubo et al. | |
| 2009/0099490 A1 | 4/2009 | Durt et al. | |
| 2009/0107258 A1 | 4/2009 | Saitoh et al. | |
| 2010/0045087 A1 | 2/2010 | Pyun et al. | |
| 2010/0244504 A1 | 9/2010 | Colja et al. | |
| 2010/0276973 A1 | 11/2010 | Zenk et al. | |
| 2010/0283299 A1 * | 11/2010 | Onuma | B60N 2/002 297/337 |
| 2011/0031788 A1 | 2/2011 | Kosik et al. | |
| 2011/0112449 A1 * | 5/2011 | Hopf | B60N 2/0244 601/91 |
| 2011/0210590 A1 | 9/2011 | Mori et al. | |
| 2012/0053794 A1 | 3/2012 | Alcazar et al. | |
| 2012/0086249 A1 | 4/2012 | Hotary et al. | |
| 2012/0096960 A1 | 4/2012 | Galbreath et al. | |
| 2012/0259248 A1 | 10/2012 | Receveur | |
| 2012/0283929 A1 | 11/2012 | Wakita et al. | |
| 2013/0009761 A1 * | 1/2013 | Horseman | B60W 40/08 340/425.5 |
| 2013/0090816 A1 * | 4/2013 | Huber | B60R 16/037 701/49 |
| 2013/0166078 A1 | 6/2013 | Heger et al. | |
| 2013/0175838 A1 | 7/2013 | Oshima et al. | |
| 2013/0251216 A1 | 9/2013 | Smowton et al. | |
| 2013/0313871 A1 | 11/2013 | Shalaby et al. | |
| 2014/0163333 A1 | 6/2014 | Horseman | |
| 2014/0167463 A1 | 6/2014 | Sakata et al. | |
| 2014/0319895 A1 * | 10/2014 | Lange-Mao | B60N 2/002 297/463.1 |
| 2014/0361590 A1 | 12/2014 | Line et al. | |
| 2015/0008710 A1 | 1/2015 | Young et al. | |
| 2015/0084985 A1 | 3/2015 | Baudu | |
| 2015/0097400 A1 | 4/2015 | Heys | |
| 2015/0099245 A1 | 4/2015 | Bouchard et al. | |
| 2015/0136146 A1 * | 5/2015 | Hood | A61G 7/002 128/845 |
| 2015/0352979 A1 * | 12/2015 | O'Bannon | B60N 2/0248 701/49 |
| 2015/0352990 A1 * | 12/2015 | Zouzal | A47C 4/54 297/284.3 |
| 2015/0367751 A1 | 12/2015 | Lamesch et al. | |
| 2016/0101710 A1 | 4/2016 | Bonk et al. | |
| 2016/0297337 A1 | 10/2016 | White et al. | |

FOREIGN PATENT DOCUMENTS

| | | |
|---|---|---|
| CN | 101374695 A | 2/2009 |
| CN | 201329822 Y | 10/2009 |
| CN | 101731862 A | 6/2010 |
| CN | 201646470 U | 11/2010 |
| CN | 101992708 A | 3/2011 |
| CN | 102015362 A | 4/2011 |
| CN | 102099227 A1 | 6/2011 |
| CN | 104044495 A | 9/2014 |
| CN | 104252615 A | 12/2014 |
| DE | 19908655 C1 | 8/2000 |
| DE | 10331624 B3 | 4/2005 |
| DE | 10353020 A1 | 6/2005 |
| DE | 102005034069 A1 | 1/2007 |
| DE | 102005038289 B3 | 3/2007 |
| DE | 102006036532 A1 | 2/2008 |
| DE | 102009021532 A1 | 11/2010 |
| DE | 102011010210 A1 | 12/2011 |
| DE | 102010056568 A1 | 7/2012 |
| DE | 102012216869 A1 | 3/2014 |

(56) References Cited

FOREIGN PATENT DOCUMENTS

| DE | 102012216178 A1 | 5/2014 |
|---|---|---|
| EP | 0489310 A1 | 6/1992 |
| EP | 2353928 A1 | 8/2011 |
| EP | 2353928 B1 | 9/2014 |
| FR | 2988051 A1 | 9/2013 |
| FR | 2988654 A1 | 10/2013 |
| FR | 2994073 A1 | 2/2014 |
| GB | 2370222 A | 6/2002 |
| GB | 2523584 B | 9/2015 |
| TW | 477405 U | 5/2014 |
| WO | 2005074754 A1 | 8/2005 |
| WO | 2011144280 A1 | 11/2011 |
| WO | 2012159688 A1 | 11/2012 |
| WO | 2013144498 A1 | 10/2013 |
| WO | 2013170335 A1 | 11/2013 |
| WO | 2014066493 A1 | 5/2014 |
| WO | 2014085302 A1 | 6/2014 |

OTHER PUBLICATIONS

U.S. Appl. No. 14/987,026, entitled "Seat Assemblies With Adjustable Side Bolster Actuators", filed Jan. 4, 2016, 15 pages.
U.S. Appl. No. 14/716,191, entitled "Adjustable Seat Assembly", filed May 19, 2015, 24 pages.
U.S. Appl. No. 14/716,197, entitled "Adjustable Seat Assembly", filed May 19, 2015, 22 pages.
U.S. Appl. No. 14/560,436, entitled "Adjustable Seat Assembly", filed Dec. 4, 2014, 19 pages.
U.S. Appl. No. 14/560,487, entitled "Adjustable Seat Assembly", filed Dec. 4, 2014, 16 pages.
Chinese Office Action and English translation for Application No. 201510308700.1, dated Mar. 3, 2017, 10 pages.
German Office Action for corresponding Application No. 10 2015 210 497.4, dated Aug. 5, 2016, 11 pages.
Chinese Office Action and English translation for Application No. 201510308700.1, dated Nov. 6, 2017, 3 pages.

* cited by examiner

| QUESTIONNAIRE | *REQUIRED |
|---|---|
| Gender | Male ▼ |
| Height* | 5' 10" ▼ |
| Weight* | 150 - 159lbs ▼ |
| Do you have any back pain?* | No ▼ |
| Have you experienced issues with your neck? | N/A ▼ |
| Have you experienced issues with your arms? | N/A ▼ |
| Have you experienced issues with your legs? | N/A ▼ |
| How oftern do you drive your primary vehicle? | Often, 4 to 6... ▼ |
| What is your activity level? | Somewhat ... ▼ |
| CANCEL | CONTINUE |
FIG. 6
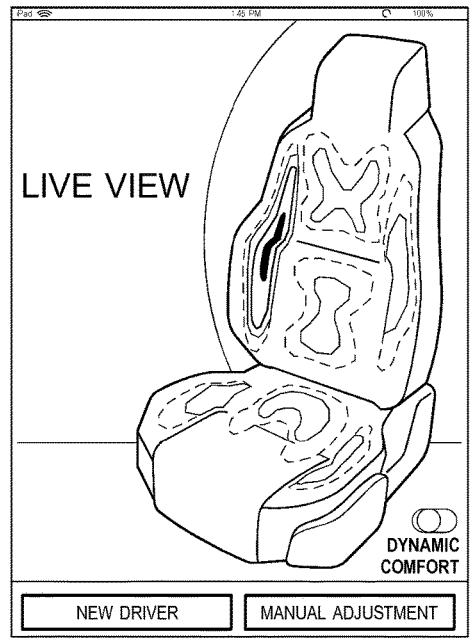
FIG. 7
FIG. 8
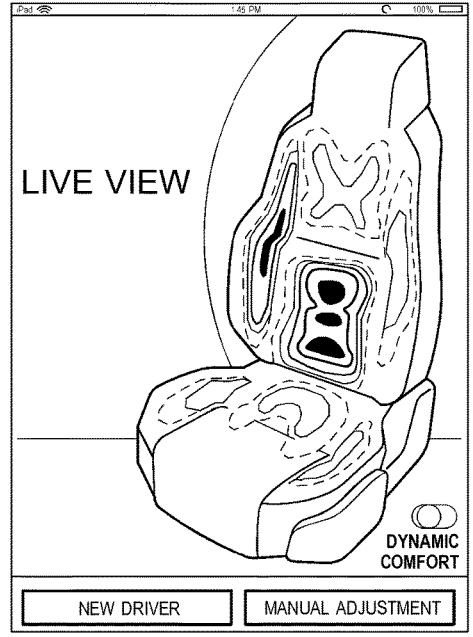
FIG. 9

ADJUSTABLE SEAT ASSEMBLY

CROSS-REFERENCE TO RELATED APPLICATIONS

This application claims the benefit of U.S. provisional application Ser. No. 62/009,585 filed Jun. 9, 2014, the disclosure of which is hereby incorporated in its entirety by reference herein.

TECHNICAL FIELD

Various embodiments relate to adjustable seat assemblies.

BACKGROUND

An adjustable seat assembly is illustrated and described in U.S. Pat. No. 5,758,924, which issued on Jun. 2, 1998 to Lear Corporation.

SUMMARY

According to at least one embodiment, a seat assembly is provided with a seat cushion. A seat back is adapted to be pivotally mounted adjacent the seat cushion. A plurality of sensors is operably connected to at least one of the seat cushion and the seat back to detect a seating position of an occupant. An actuator is operably connected to at least one of the seat cushion and the seat back for adjustment at least one of a plurality of settings of the seat assembly. A controller is in electrical communication with the plurality of sensors and the actuator, and is configured to receive data from the plurality sensors, compare the data to determine if the occupant is seated evenly, and adjust the actuator to balance the occupant posture seating position.

According to at least another embodiment, a seat assembly is provided with a seat back. A first air bladder assembly or a first series of multiple bladders is oriented in a thoracic region of the seat back. A second air bladder assembly or a second series of multiple bladders is oriented in at least one of a lumbar region, a sacrum region, and a scapular region of the seat back. An inflation device is in fluid communication with the first and second inflatable air bladder assemblies. A controller is in electrical communication with the inflation device. The controller is configured to operate the inflation device to inflate the first air bladder assembly. The controller is also configured to operate the inflation device to inflate the second air bladder assembly after initiating inflation of the first air bladder assembly. In embodiments, the method provides for sequential posture alignment.

According to at least another embodiment, a computer-program product is embodied in a non-transitory computer readable medium that is programmed for automatically adjusting a seat assembly. The computer-program product includes instructions for receiving input indicative of measured pressure values from a plurality of sensors in a plurality of zones of a seat assembly. The data is compared to determine if the occupant is seated evenly. An actuator is adjusted to balance the occupant posture seating position.

According to at least another embodiment, a computer-program product is embodied in a non-transitory computer readable medium that is programmed for adjusting a seat assembly. The computer-program product includes instructions for operating an inflation device to inflate a first air bladder assembly oriented in a thoracic region of a seat back. The inflation device operates to inflate a second air bladder assembly oriented in at least one of a lumbar region, a sacrum region, and a scapular region of the seat back, after initiating inflation of the first air bladder assembly. In embodiments, the product provides for sequential posture alignment.

According to at least another embodiment, a method for adjusting a seat assembly measures pressure values from a plurality of sensors in a plurality of zones of a seat assembly. The data is compared to determine if the occupant is seated evenly. An actuator is adjusted to balance the occupant posture seating position.

According to at least another embodiment, a method for adjusting a seat assembly inflates a first air bladder assembly or a first series of multiple bladders oriented in a thoracic region of a seat back. A second air bladder assembly or a second series of multiple bladders is oriented in at least one of a lumbar region, a sacrum region, and a scapular region of the seat back, and is inflated after initiating inflation of the first air bladder assembly. In embodiments, the method provides for sequential posture alignment.

BRIEF DESCRIPTION OF THE DRAWINGS

FIG. 6 is another display image for the vehicle seating system of FIG. 4;

FIG. 7 is another display image for the vehicle seating system of FIG. 4;

FIG. 8 is another display image for the vehicle seating system of FIG. 4;

FIG. 9 is another display image for the vehicle seating system of FIG. 4;

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

A comfort, posture and wellness seating system for vehicle seat assemblies provides a visual interface with adjustment hardware organically or inorganically. The system may be employed to properly configure any new or existing seating system. The system can also address specific comfort, posture or preferences, such as thoracic support. The seating system objectifies comfort data and biomechanical knowledge to make the data transferable. The seating system connects biomechanical optimization to measurable engineering data to make a complete comfort, posture and wellness seating system.

The comfort, posture and wellness seating system integrates anthropometry, bio-mechanics, and historical seating comfort data. The seating system can be employed in original equipment for vehicles or in aftermarket products. Applicable markets include automotive, mass transit, airlines, etc., as well as non-vehicular seating such as office, home, commercial, and public venue seating.

Figure 1:
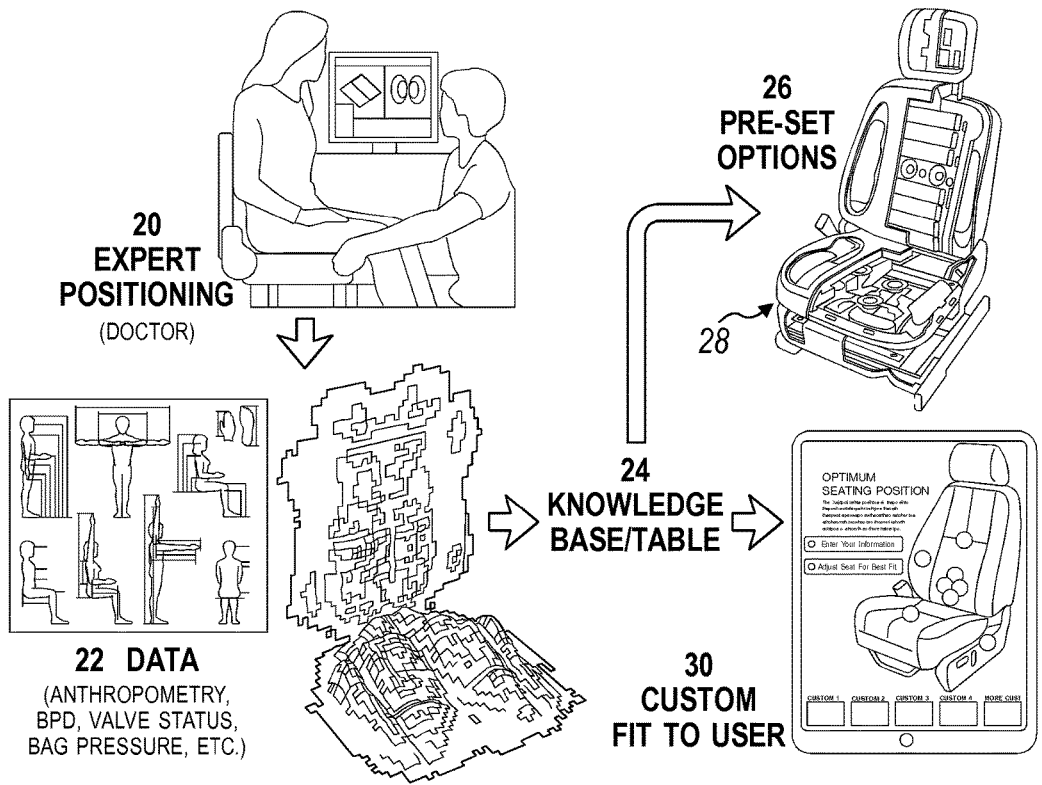
FIG. 1 is a flowchart of a method for determining various adjustment positions of a vehicle seat assembly for various users, according to an embodiment.

Referring now to FIG. 1, a flowchart of a method for determining various adjustment positions of a vehicle seat assembly for various users is illustrated, according to an embodiment. Data collection may occur at block 20. The data collection 20 may include expert positioning of a suitable sample of occupants for optimal comfort or preferred posture by a medical professional. The data collection 20 can be used at specific sites on an ongoing basis if required. The expert input provides a high level of expert comfort, posture and personalized fitting.

The data 22 may be based on anthropometry, body pressure distribution (BPD), status of actuators (such as pressure of inflatable air bladders, status of valves or the like), or other data that provides a comfort, posture and biomechanically optimized position of an adjustable vehicle seat assembly. The data is collected in a knowledge base 24 or table for setting adjustments based on categories of data. The knowledge base 24 may be compiled from the expert positioned data 20 and the occupant specific data 22. The setting adjustments from the knowledge base 24 are utilized for pre-set options 26 in a vehicle seat assembly 28. The setting adjustments 24 can be customized by a user at a controller or display 30.

Figure 2:
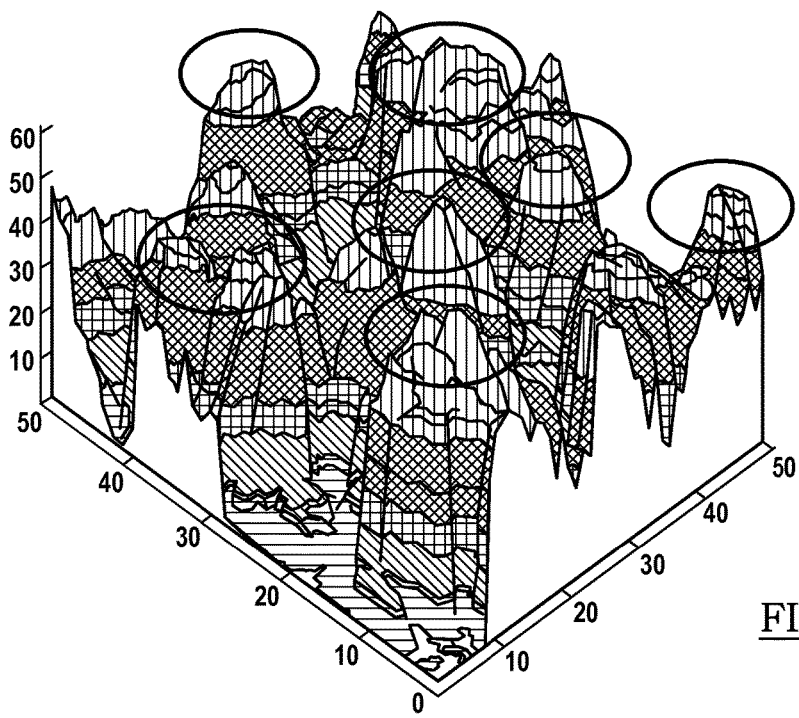
FIG. 2 is a graph of data collected in the method of FIG. 1.

Referring to FIG. 2, input data 20, 22 can be plotted versus adjustment settings 20, 24 for high level categorization. The settings 20, 24 can be categorized by topology clustering for setting the pre-set options 26. Various setting options 26 may be provided for various types of driving. For example a touring setting may provide per package settings and basic comfort, posture and biomechanically optimized seating position recommendations. The touring setting may also provide optimal visibility, use of features and controls, and the like. A performance setting may be provided for active drivers to provide a more erect position with firmer seating. Additionally, a luxury setting may be more reclined with softer seating.

Figure 3:
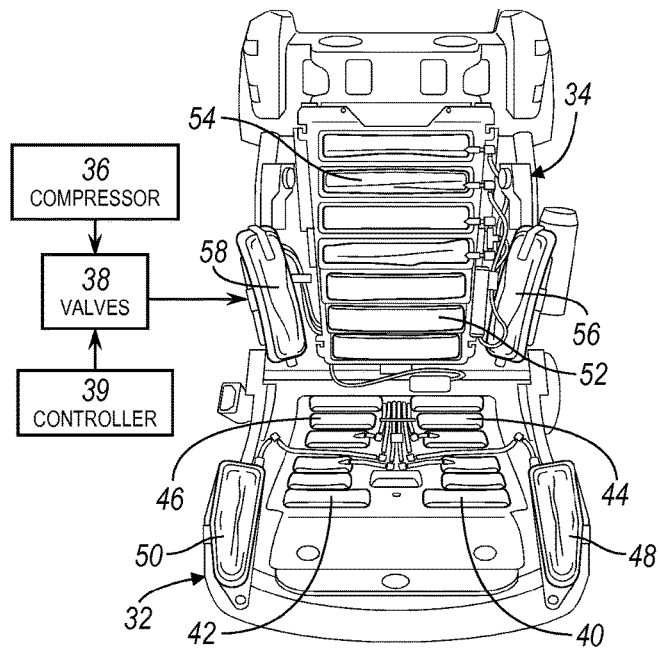
FIG. 3 is a front perspective view of a vehicle seat assembly, illustrated partially disassembled, according to an embodiment.

FIG. 3 illustrates the vehicle seat assembly 28 with a cover removed. The seat assembly 28 includes a seat cushion 32 adapted to be mounted for motor-driven adjustable translation in a fore and aft direction and in an up and down direction of a vehicle. The seat assembly 28 includes a seat back 34 pivotally connected to the seat cushion 32 to extend generally upright relative to the seat cushion 32 for motor-driven pivotal adjustment relative to the seat cushion 32. A head restraint (not shown) is mounted for motor-driven adjustable translation to the seat back 34.

At least one compressor 36 provides a source of air to the seat assembly 28. A plurality of valves 38 receive the compressed air and are controlled by a controller 39 for regulating compressed air into and out of the seat assembly 28. The seat cushion 32 includes a forward left air bladder 40, a forward right air bladder 42, a rear left air bladder 44, a rear right air bladder 46, a left side bolster air bladder 48, and a right side bolster air bladder 50. The seat back 34 includes a plurality of lumbar air bladders 52, a plurality of thoracic air bladders 54, a left side bolster air bladder 56, and a right side bolster air bladder 58. The valves 38 may be provided as a common valve bank that is housed in the seat back 34 or under the seat cushion 32; or the valves 38 may each be provided on each of the air bladders 40, 42, 44, 46, 48, 50, 52, 54, 56, 58. The compressor 36 may be provided in the seat back 34, the seat cushion 32 or concealed within the vehicle body. The controller 39 may be provided in a module under the seat cushion 32, and may be a multifunction controller that also controls other functions in the vehicle.

It is believed that supporting the thoracic region of the spine can reduce forces and support as much as one-third of the upper body mass. By increasing support of the upper body mass, loads are reduced on the muscles, ligaments, and spine and pelvic regions. Decreased load reduces fatigue on these areas of the body. The thoracic air bladders 54 are adjustable to provide the right degree of support in the correct location necessary to reduce such loading.

The controller 39 receives the adjustment settings 24 from pre-set data 26 or from customized data 30. The data may be input from an interface that is provided in the vehicle. The interface may be integrated into the vehicle, such as an instrument panel display that is in suitable wired or wireless communication with the controller 39. The interface may be remote, such as a personal digital assistant (PDA) including phones, tablets and the like. The interface may be provided as a smart device application, wherein users enter relevant information about themselves. The smart phone interface may not require on-site expertise or seat properties. The remote interface permits a user to transport settings to each vehicle, such as personal passenger vehicles, airline seating, rental cars, and the like.

Figure 4:
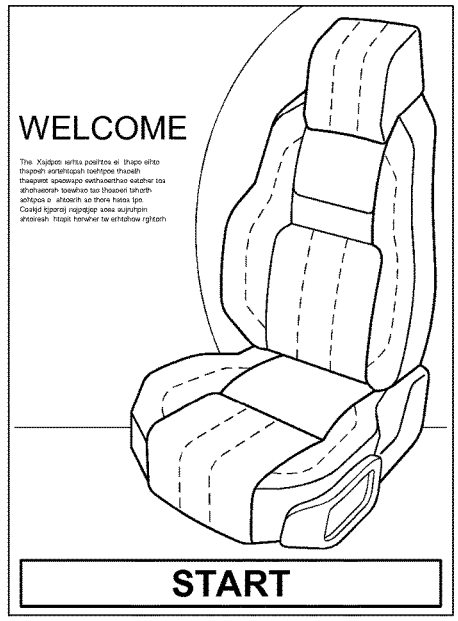
FIG. 4 is a display image for a vehicle seating system according to an embodiment.
Figure 5:
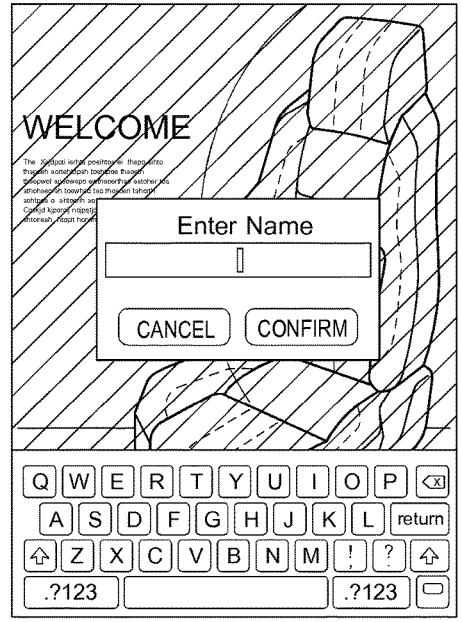
FIG. 5 is another display image for the vehicle seating system of FIG. 4.

FIGS. 4-9 illustrate display images from an interface, such as a tablet. FIG. 4 illustrates a welcome screen wherein a data collection process is initiated. FIG. 5 illustrates a screen wherein a user name is input to identify the user. FIG. 6 illustrates another input screen wherein anthropometric and personal health data, such as wellness and activity level, is collected. This data is utilized to adjust the seat to the pre-set options 26, based on prior-collected data 22 in knowledge base 24.

Each of the air bladders 40, 42, 44, 46, 48, 50, 52, 54, 56, 58 may include a pressure sensor to detect air pressure in the respective bladder 40, 42, 44, 46, 48, 50, 52, 54, 56, 58. Any pressure sensor is contemplated, such as a pneumatic pressure sensor at the outlet valve of each respective air bladder 40, 42, 44, 46, 48, 50, 52, 54, 56, 58. Pressure can also be sensed by contact pressure sensors disposed in front of or behind some or all of the respective air bladders, including on a front or rear surface thereof. The contact pressure sensors may include pressure-sensing mats, such as those available by Tekscan®, Inc. of 307 West First Street. South Boston, Mass. 02127-1309, USA. FIG. 7 illustrates a depiction of the vehicle seat assembly 28 with zones ranging in color to depict a distribution of pressure upon the seat. This visualization may assist an occupant in positioning upon the seat assembly 28 with live visual feedback.

A dynamic comfort, posture and biomechanically optimized option is offered. Selection of the dynamic comfort option measures the pressure in the sensors at FIG. 8, and displays a live view as in FIG. 9. The controller 39 compares the sensor values, and if the controller 39 determines that the occupant is not seated evenly, the controller 39 balances the air pressure in opposing air bladders to balance the occupant seating position.

Figure 10:
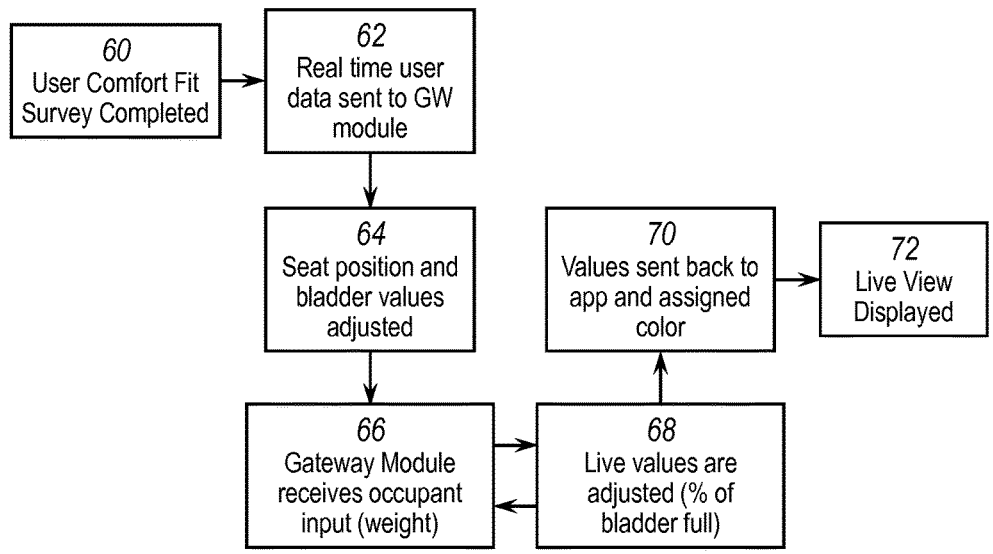
FIG. 10 is a flowchart of a method for adjusting a vehicle seat assembly according to an embodiment.

FIG. 10 depicts a flowchart for a method for adjusting the seat assembly 28 according to an embodiment. At block 60 the user comfort fit survey is completed. This process may be performed in an application on a PDA, tablet or smartphone, or in a controller in the vehicle. At block 62, real time user data is sent to a gateway module, or controller 39. In block 64, the seat assembly 28 is positioned, and the air bladder values are adjusted. At block 66, the gateway module receives an occupant weight distribution from the air bladder pressure sensors. At block 68 live values are adjusted, such as a percentage of bladder fullness. At block 70, the values are sent to the interface application, and the range of values is assigned a range of colors. In block 72, a live view is displayed, as in FIG. 9. Steps 66 and 68 are repeated for dynamically adjusting the seat assembly 28 to the occupant's position. Steps 66, 70 and 72 are repeated incrementally to provide the live view of the pressure distribution.

Figure 11:
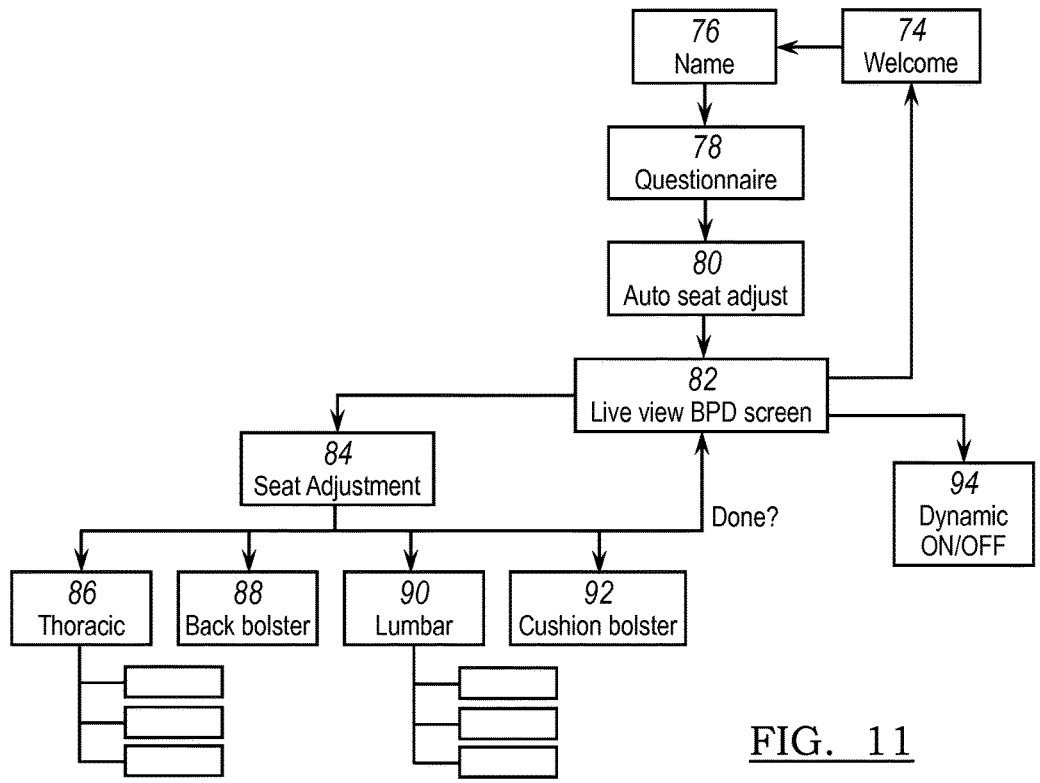
FIG. 11 is a flowchart of another method for adjusting a vehicle seat assembly according to another embodiment.

FIG. 11 depicts a flowchart for a method for adjusting the seat assembly 28 according to another embodiment. At block 74 a welcome screen initiates a data collection process. At block 76 a user name is input to identify the user. At block 78 another input screen includes a questionnaire wherein anthropometric and ergonomic data and activity level is collected. This data is utilized to adjust the seat at block 80 to the pre-set options 26, based on prior-collected data 22 in knowledge base 24. At block 82, a depiction of the vehicle seat assembly 28 is provided with zones ranging in color to depict a distribution of pressure upon the seat assembly 28. If manual adjustment is selected at block 84, the occupant can select a zone of the seat for adjustment, such as thoracic 86, back bolster 88, lumbar 90 and cushion bolster 92. Once manual adjustment is completed, the live view body pressure distribution (BPD) screen 82 is updated. If a dynamic mode is selected at block 84, then the adjustments and live view are updated based on the measurements from the pressure sensors and the anthropometric data.

Misalignments of spinal vertebrae and discs may cause irritation to the nervous system and may be an underlying cause to many health problems. Additionally, spinal misalignments can be a contributing factor to a herniated disc, a bulging disc, a facet joint problem, osteoarthritis and spinal stenosis. Sequential adjustment of a seat assembly can enhance posture to minimize spinal misalignments.

Figure 12:
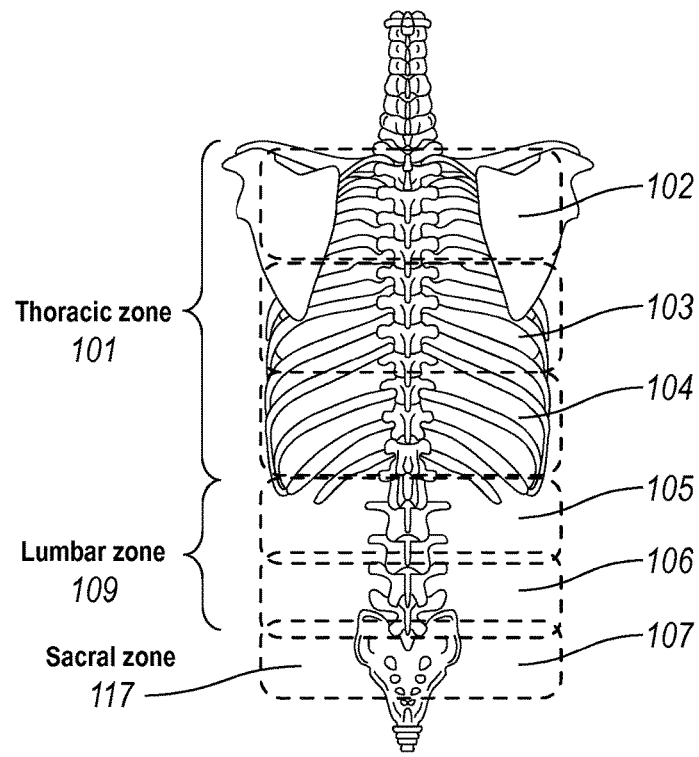
FIG. 12 is a rear schematic view of a seat assembly and a skeletal occupant according to an embodiment.
Figure 13:
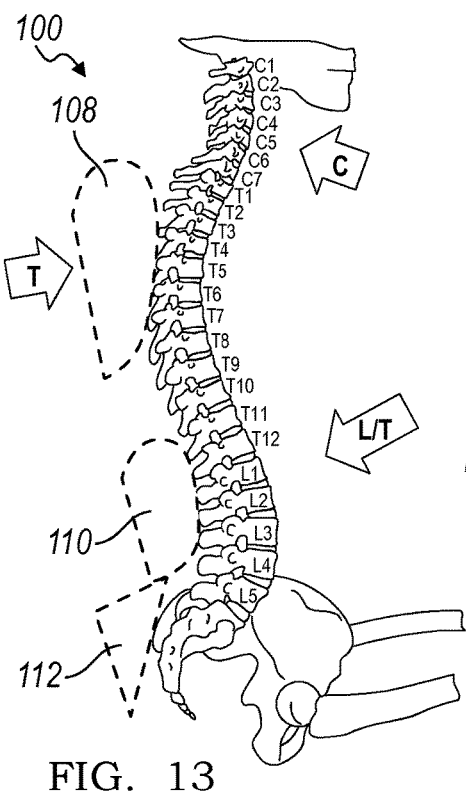
FIG. 13 is a side schematic view of actuation zones and direction of a seat actuation system.

FIGS. 12 and 13 illustrate a seat assembly referenced by numeral 100. The seat assembly 100 is similar to prior embodiments, and is illustrated schematically without the frame, cushioning, trim, controller, valves, compressor and the like. The seat assembly 100 is also illustrated with a skeletal occupant for discussion of mechanical orientations of relevant biomechanical features of average occupants. The seat assembly 100 is depicted by an arrangement of air bladder assemblies, each named for a targeted position within the seat assembly 100 with reference to a corresponding contact region of an occupant. The air bladder assemblies include a thoracic air bladder assembly 101 located in a thoracic region of the seat assembly 100 to support a thoracic region of an occupant, which is the T1 to T12 vertebrae, the ribs and in between the scapulae or shoulder blades.

Referring to FIG. 12, a thoracic zone air bladder assembly 101 includes a scapular air bladder 102, a medial thoracic air bladder 103 below the scapular air bladder 102; and a low thoracic air bladder 104 is also provided beneath the medial thoracic air bladder 103, which extend to support spine, scapula, and ribs. The three thoracic air bladders 102, 103, 104 permit independent control of these regions for targeted support.

With continued reference to FIG. 12 a lumbar zone air bladder assembly 109 is provided below the thoracic air bladder assembly 101 to support the lower back at L1-L5 vertebrae. The lumbar zone air bladder assembly 109 includes a pair of air bladders 105, 106 according to an embodiment.

With continued reference to FIG. 12, a sacral zone air bladder assembly 117 is provided below the lumbar air bladder assembly 109 to support the sacral regions of the occupant. The sacral zone air bladder assembly 117 may be provided with a single air bladder 107.

Figure 14:
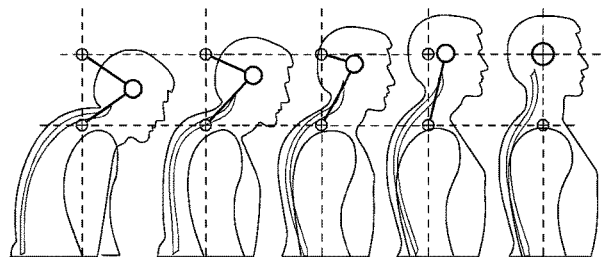
FIG. 14 is a series of side schematic views of an occupant in various postures.

According to at least one embodiment, the air bladders 102, 103, 104, 105, 106, 107 are inflated in a sequence to support posture alignment, posture support and movement. The sequence can be controlled by the seat controller 39 as described above in prior embodiments. Initially, the thoracic air bladder assembly 101 is inflated. The thoracic air bladders 102, 103, 104 may be inflated individually or simultaneously. FIG. 14 illustrates posture of an occupant during the inflation of the thoracic air bladders 103, 104 from left to right as the occupant approaches and achieves a wellness and posture position from back support 108 (FIG. 13) and forward motion (arrow T, FIG. 13) promoting pressure applied in thoracic T5-T10 vertebrae. With the improved posture, the occupant is induced to straighten its back and sit upright.

Subsequently, the lumbar air bladders 105, 106 are inflated thereby supporting the lumbar vertebrae with pressure 110 in FIG. 14, while the lower thorax and lumbar vertebrae move rearward (arrow L/T), and the cervical vertebrae (arrow C) move rearward. Next, the scapular air bladder 102 is inflated for scapular support. Subsequently, the sacral air bladder 107 is inflated for sacrum pressure 112 (FIG. 13) to promote a slight forward tilt.

Referring again to FIG. 12, the seat assembly 100 may include a plurality of sensors each in at least one of the air bladders 102, 103, 104, 105, 106, 107. The sensors measure pressure or proximity at each location to provide feedback to the controller 39 for subsequent adjustment and monitoring as described in the prior embodiments. The sensors may be bladder pressure sensors, bladder valve pressure feedback sensors, proximity sensors, tri-axial angular measurement sensors or the like. Additionally, any arrangement and quantity of sensors is contemplated for various seat assembly embodiments.

While various embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:
1. A seat assembly comprising:
a seat cushion;
a seat back adapted to be pivotally mounted adjacent the seat cushion;

a plurality of sensors operably connected to at least one of the seat cushion and the seat back to detect a seating position of an occupant;

at least one actuator operably connected to at least one of the seat cushion and the seat back for adjustment of at least one of a plurality of settings of the seat assembly; and a controller in electrical communication with the plurality of sensors and the at least one actuator, the controller being programmed to:
receive data from the plurality of sensors,
compare the data to determine if the occupant is seated evenly left-to-right, and
adjust the at least one actuator to balance a left-to-right occupant posture seating position.

2. The seat assembly of claim 1 wherein the plurality of sensors comprise:
at least one thoracic sensor; and
at least one lumbar sensor.

3. A seat assembly comprising:
a seat back;
a first air bladder assembly oriented in a thoracic region of the seat back;
a second air bladder assembly oriented in at least one of a lumbar region, a sacrum region, and a scapular region of the seat back;
an inflation device in fluid communication with the first and second inflatable air bladder assemblies; and
a controller in electrical communication with the inflation device and configured to:
operate the inflation device to inflate the first air bladder assembly; and
operate the inflation device to inflate the second air bladder assembly after initiating inflation of the first air bladder assembly.

4. The seat assembly of claim 3 wherein the first air bladder assembly comprises:
a scapular air bladder oriented in a high thoracic region of the seat back;
a mid thoracic bladder oriented in a mid thoracic region of the seat back below the scapular air bladder; and
a low thoracic air bladder oriented in a low thoracic region of the seat back below the mid thoracic air bladder.

5. The seat assembly of claim 4 wherein the second air bladder assembly comprises a lumbar air bladder oriented in the lumbar region of the seat back below the thoracic region of the seat back; and
wherein the controller is programmed to operate the inflation device to inflate the scapular air bladder after initiating inflation of the lumbar air bladder for sequential posture alignment.

6. The seat assembly of claim 3 wherein the second air bladder assembly comprises an upper lumbar air bladder oriented in an upper lumbar region of the seat back below the thoracic region of the seat back; and
a lower lumbar air bladder oriented in a lower lumbar region of the seat back below the upper lumbar air bladder; and
wherein the controller is further configured to operate the inflation device to inflate a lumbar air bladder zone after initiating inflation of the thoracic air bladder for sequential posture alignment.

7. The seat assembly of claim 3 wherein the second air bladder assembly is oriented in the lumbar region;
wherein the seat assembly further comprises a scapular air bladder oriented in the scapular region of the seat back above a mid thoracic region of the seat back; and
wherein the controller is further configured to operate the inflation device to inflate a scapular air bladder zone after initiating inflation of the second air bladder assembly for sequential posture alignment.

8. The seat assembly of claim 3 wherein the second air bladder assembly is oriented in the scapular region;
wherein the seat assembly further comprises a sacral air bladder oriented in the sacrum region of the seat back below the lumbar region of the seat back; and
wherein the controller is further configured to operate the inflation device to inflate the sacral air bladder after initiating inflation of the second air bladder assembly for sequential posture alignment.

9. The seat assembly of claim 3 wherein operation of the inflation device to inflate the second air bladder assembly after initiating inflation of the first air bladder assembly provides sequential posture alignment.

10. A computer-program product embodied in a non-transitory computer readable medium that is programmed for automatically adjusting a seat assembly, the computer-program product comprising instructions for:
receiving input indicative of measured pressure values from a plurality of sensors in a plurality of left and right zones of a seat assembly;
comparing the input to determine if an occupant is seated evenly left-to-right; and
adjusting an actuator to balance a left-to-right occupant posture seating position.

11. The computer-program product of claim 10 further comprising instructions for repeating the instructions of claim 10 incrementally.

12. A computer-program product embodied in a non-transitory computer readable medium that is programmed for adjusting a seat assembly, the computer-program product comprising instructions for:
operating an inflation device to inflate a first air bladder assembly oriented in a thoracic region of a seat back; and
operating the inflation device to inflate a second air bladder assembly oriented in at least one of a lumbar region, a sacrum region, and a scapular region of the seat back, after initiating inflation of the first air bladder assembly.

13. The computer-program product of claim 12 further comprising instructions for:
operating the inflation device to inflate a lumbar air bladder oriented in the lumbar region of the seat back below the thoracic region of the seat back after initiating inflation of the thoracic air bladder assembly for sequential posture alignment.

14. The computer-program product of claim 12 further comprising instructions for:
operating the inflation device to inflate a scapular air bladder oriented in the scapular region of the seat back after initiating inflation of a lumbar air bladder for sequential posture alignment.

15. The computer-program product of claim 14 further comprising instructions for operating the inflation device to inflate a sacral air bladder oriented in the sacrum region of the seat back below the lumbar region of the seat back after initiating inflation of the scapular air bladder for sequential posture alignment.

16. The computer-program product of claim 12 wherein operating the inflation device to inflate the second air bladder assembly after initiating inflation of the first air bladder assembly provides sequential posture alignment.

17. A method for adjusting a seat assembly comprising steps of:
  inflating a first air bladder assembly oriented in a thoracic region of a seat back; and
  inflating a second air bladder assembly oriented in at least one of a lumbar region, a sacrum region, and a scapular region of the seat back, after initiating inflation of the first air bladder assembly.

18. The method of claim 17 further comprising steps of:
  inflating a lumbar air bladder assembly oriented in the lumbar region of the seat back below the thoracic region of the seat back after initiating inflation of the first air bladder assembly for sequential posture alignment.

19. The method of claim 17 further comprising steps of:
  inflating a lumbar air bladder oriented in the lumbar region of the seat back below the thoracic region of the seat back; and
  inflating a scapular air bladder oriented in a scapular region of the seat after initiating inflation of the lumbar air bladder for sequential posture alignment.

20. The method of claim 19 further comprising a step of inflating a sacral air bladder oriented in the sacrum region of the seat back below the lumbar region of the seat back after initiating inflation of the scapular air bladder for sequential posture alignment.

21. The method of claim 17 wherein inflating the second air bladder assembly after initiating inflation of the first air bladder assembly provides sequential posture alignment.

* * * * *